United States Patent [19]

Aonuma et al.

[11] 4,336,043
[45] Jun. 22, 1982

[54] FILTER UNIT CONSTRUCTION FOR A FILTRATION ASSEMBLY

[75] Inventors: Masaru Aonuma; Kazuyuki Nanaumi, both of Suzaka, Japan

[73] Assignee: Orion Machinery Company Limited, Nagano, Japan

[21] Appl. No.: 165,507

[22] Filed: Jul. 3, 1980

[30] Foreign Application Priority Data

Nov. 13, 1979 [JP] Japan .......................... 54-158041[U]

[51] Int. Cl.³ ............................................. B01D 50/00
[52] U.S. Cl. ....................................... 55/483; 55/218; 55/487; 55/498; 55/502; 210/259; 210/323.2; 210/488
[58] Field of Search ................. 55/219, 218, 482, 484, 55/483, 486–488, 502, 510; 210/314–316, 340, 323.2, 488–492, 259

[56] References Cited

U.S. PATENT DOCUMENTS

| | | | |
|---|---|---|---|
| 2,990,032 | 6/1961 | Sandvig ................................ | 55/498 |
| 3,344,923 | 10/1967 | Pall et al. .......................... | 210/323.2 |
| 3,460,680 | 8/1969 | Domnick ............................. | 210/315 |
| 3,890,123 | 6/1975 | Kuga ................................... | 210/315 |
| 4,050,237 | 9/1977 | Pall et al. ,............................ | 55/498 |
| 4,105,562 | 8/1978 | Kaplan et al. ..................... | 210/323.2 |
| 4,136,009 | 1/1979 | Samiran .............................. | 55/219 |
| 4,157,968 | 6/1979 | Kronsbein ......................... | 55/482 |

Primary Examiner—Bernard Nozick
Attorney, Agent, or Firm—Toren, McGeady and Stanger

[57] ABSTRACT

A filtration assembly particularly for filtering fluid media such as compressed air is formed with a housing defining a fluid inlet and a fluid outlet and with a filter unit arranged within said housing to have the fluid media to be filtered flow therethrough. The filter unit is formed of a plurality of interchangeable filter elements joined together to form the filter unit by connecting devices including a head cover and a bottom cover arranged between juxtaposed ends of adjacent filter elements to mount said filter elements together in fluid tight relationship. The head cover is formed of a recess into which the bottom cover extends with a sealing ring being arranged in said recess in fluid tight engagement between the head cover and the bottom cover.

7 Claims, 4 Drawing Figures

FILTER UNIT CONSTRUCTION FOR A FILTRATION ASSEMBLY

The present invention relates generally to filtration assemblies and more particularly to the structure of a filter unit for such assemblies. The filtration assembly of the present invention is essentially of the type which is utilized to remove impurities, such as dust, oil mist and water, from compressed air. More specifically, the filter unit of the invention is constructed of a plurality of filter elements which may be formed with standardized dimensions and which may therefore be interchangeably utilized.

Filtration assemblies of the prior art of the type to which the present invention relates utilized to remove impurities from compressed air are generally formed with a filter unit having an outer diameter and a length corresponding to the quantity of air flow which is to be filtered. Such assemblies usually comprise a body member defining an inlet and an outlet through which the compressed air to be filtered enters and leaves the assembly. The filter unit is contained within a housing and is arranged so that the air to be filtered passes through the filter unit.

However, in prior art assemblies, when it is desired to adapt the assembly to treat different volumes of compressed air to be processed, it becomes necessary to have available a plural number of filter units of different types in order to enable variation of the size of the filter area thereof. This requirement for different types and sizes of filter units increases the cost of manufacture of the assembly and of the storage and control of the filter unit.

The present invention is directed toward provision of a filter unit for a filtration assembly of the type described which may be constructed in standardized form so that the standardized filter element of such a filter unit may be combined singly or by connecting a plural number of such filter elements serially in order to adapt the filtration assembly to the specific quantity of the air to be filtered and in order thereby to obtain a required filter area with ease and with lowered cost.

SUMMARY OF THE INVENTION

The present invention may be briefly described as a filtration assembly particularly for filtering fluid media such as compressed air which includes housing means defining a fluid inlet and a fluid outlet, a filter unit arranged within said housing means to have the fluid media flowing between the inlet and the outlet pass therethrough, said filter unit comprising a plurality of filter elements joined together to form the filter unit, connecting means for joining the filter elements together, and groove means in the connecting means defining a flow path for fluid impurities to pass between the filter elements of the filter unit.

Each of the filter elements may be formed of a standardized size and construction so that they may be interchangeably utilized in assembling the filter unit.

The connecting means may comprise at least one hand cover mounted at one end of the filter element and at least one bottom cover mounted at a juxtaposed end of an adjacent filter element in order to mount said filter elements together in fluid-tight relationship.

A head cover of the connecting means is mounted at one end of the filter unit and a bottom cover of the connecting means is mounted at an opposite end of the filter unit in order to effect fluid-tight connections thereat, whereby the filter unit may be arranged within the housing means of the assembly in order to cause essentially all of the fluid media flowing between the inlet and the outlet to pass therethrough.

The head cover of the connecting means comprises a generally annular member having an annular recess defined therein and the bottom cover comprises a generally annular cylindrical body located to extend into sealed engagement with the annular recess with a sealing ring being arranged within the recess in sealed engagement between the head cover and the bottom cover.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there is illustrated and described a preferred embodiment of the invention.

DETAILED DESCRIPTION OF THE PREFERRED EMBODIMENT

Figure 1:
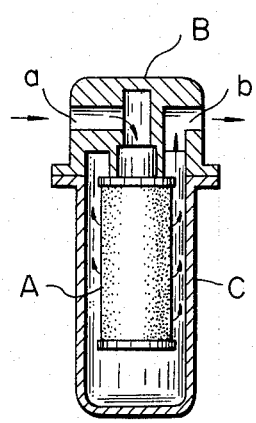
FIG. 1 is a schematic cross-sectional view of a conventional filter device.
Figure 2:
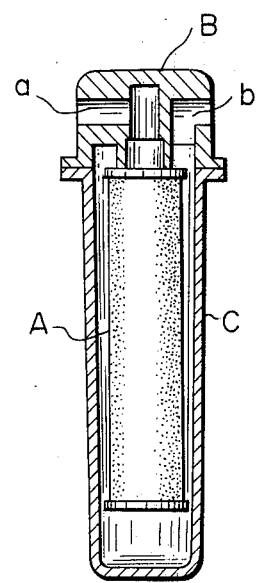
FIG. 2 is a schematic cross-sectional view of another example of a conventional filter device.

Referring now to the drawings, wherein similar parts are identified with like reference numerals throughout the various figures thereof, filtration assemblies of the type to which the present invention relates constructed in accordance with conventional techniques, are shown in FIGS. 1 and 2, these filter assemblies being utilized in devices to remove impurities from compressed air. As shown in FIGS. 1 and 2, such filtration assemblies are provided in accordance with the prior art with a filter unit A which has an outer dimension and a length corresponding to the quantity of air flow which is to be filtered. The filter assembly includes a body member B which defines an inlet a for the compressed air to be passed through the filter element A and an outlet b through which the compressed air is discharged. The filter unit A is mounted within a housing member C.

Figure 3:
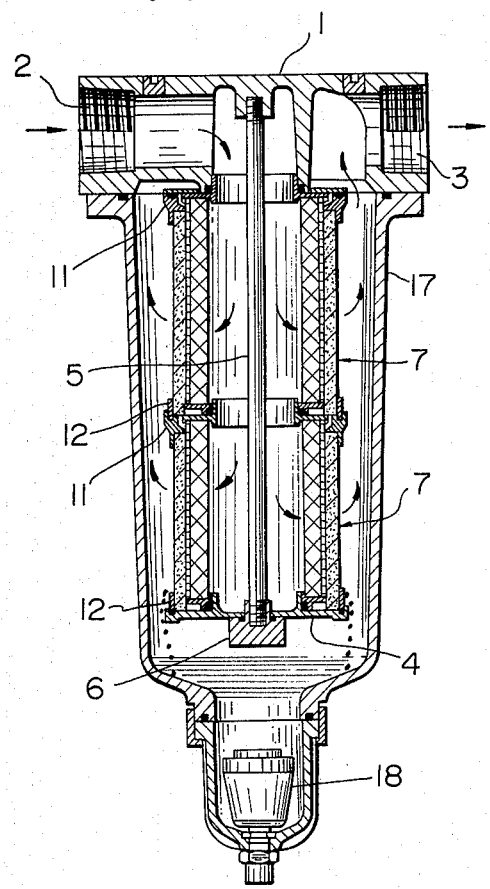
FIG. 3 is a cross-sectional view of a filtration assembly constituting an embodiment of the present invention.
Figure 4:
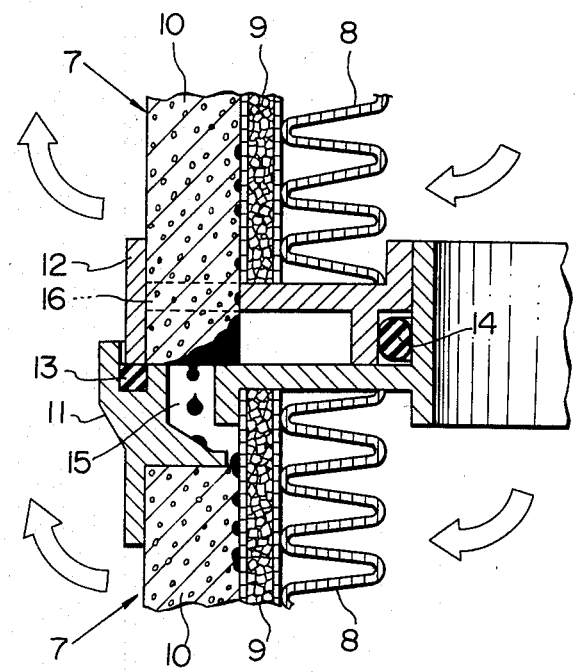
FIG. 4 is an enlarged cross-sectional view of a principal part of the embodiment of the invention shown in FIG. 3.

A filtration assembly of this type structured in accordance with the present invention is shown in FIGS. 3 and 4. The embodiment of the present invention depicted includes a body member 1 defining an inlet 2 and an outlet 3 through which the compressed air to be filtered may flow. A filter unit comprised of a plurality of filter elements 7 is attached to the body 1 and a housing member 17 enclosing the filter unit is connected with the body 1.

An end plate 4 is attached at the lower end of the filter unit and it will be seen that each of the filter elements 7 is composed of a three-layer construction comprising a primary filter layer 8 which is adapted mainly to entrap larger particles contained within the compressed air. A secondary filter layer 9 is adapted mainly to entrap particles of a smaller grain size than that of the impurities which are removed by the filter element 8 and a tertiary filter layer 10 is provided in order to entrap impurities of a still smaller grain size, such as oil, with the tertiary layer 10 being formed as the outer layer of the filter element 7, as depicted in FIGS. 3 and 4.

At the top and bottom ends of each of the filter elements 7 there are provided, respectively, a head cover 11 and a bottom cover 12 each formed with a generally annular configuration. The head cover 11 is constructed with an upper portion which is adapted to be engaged in fluid-tight relationship with either a bottom face of the body 1 or with the bottom cover 12 of an adjacent filter element 7. Additionally, a bottom cover 12 located at the lower end of the filter unit is engaged in fluid-tight connection with the end plate 4.

The assembly of the invention is provided with opposed grooves 15, 16 for allowing fluid impurities such as oil to drop therethrough. The grooves extend to the edge of the tertiary filter layer 10 with the groove 15 being formed in the head cover 11 and the groove 16 being formed in the bottom cover 12. In the embodiment shown, the tertiary filter layer 10 enters inside the groove 16 of the bottom cover 12. When the head cover 11 and the bottom cover 12 are aligned and inserted to interconnect a plurality of filter elements 7 in a serially arranged construction, the shape of the groove may be arbitrarily selected so long as the edge of the filter element, particularly that of the tertiary filter layer 10, is located relative to the groove in order to enable the oil in the compressed air to be removed by means of the connection formed substantially through the oil grooves 15 and 16.

The housing member 17 attached to the body 1 and housing the filter elements 7 includes at the lower end thereof an automatic drain 18 which is connected to the bottom of the housing 17.

In the construction described, compressed air containing impurities flows through the inlet 2 and through the body member 1 into the filter unit composed of the filter elements 7. The impurities contained in the air flowing through the filter unit are then removed as the air passes through the filter layers 8, 9 and 10 successively with the air then passing between the elements 7 and the housing 17 to be discharged to the exterior of the assembly through the outlet 3 formed in the body 1.

The connecting means of the invention which include the head cover 11 and the bottom cover 12 also include seal rings 13 and 14. A seal ring 13 is arranged within a recess in the head cover 11 into which the bottom cover 12 extends in sealed engagement as shown in FIG. 4. As indicated in the drawings, seal rings 13, 14 may be provided between the end face of the body 1 and the upper end of the filter unit, between the lower end of the filter unit and the end plate 4, and between adjacent filter elements 7. Unprocessed compressed air containing impurities is thereby caused to flow into the space between the filter unit and the housing 17 only by passing through the filter unit.

In the filtering operation discussed above utilizing a filter unit composed of the filter elements 7, impurities of a comparatively large size in solid form, such as dust, will be caught by the primary filter layer 8 and most of the fine solids and oil mist which have passed through the primary filter layer 8 without being entrapped therein will be collected by the secondary filter layer 9. Oil and water collected and condensed by the secondary filter layer 9 will drop by force of gravity through the boundary region of the secondary filter layer 9 and the tertiary filter layer 10 and will flow into the groove 15 formed in the head cover 11 between each of the filter elements 7 and into the next stage of the filter assembly having passed through the groove 16 provided on the bottom cover 12. Oil and other impurities which have flowed into the groove 15 of the head cover 11 will drop into the bottom of the housing 17 along with oil collected and condensed by the secondary filter layer 9 of each of the filter elements 7 and it will be suitably discharged from the assembly by means of the automatic drain 18.

The useful life of the filter elements 7 will depend mainly upon the extent to which the filter elements become clogged by dust and other impurities. Accordingly, if a multi-layer construction is utilized for the filter element 7 and the corrugated cross section is used for the primary filter layer 8 in order to catch and collect dust, thereby increasing its filtering area, the life of the filter element may be prolonged. However, this is not necessarily limited to the construction shown in the embodiment depicted.

In the embodiment shown, the head cover 11 and the end cover 12 are closely inserted so as to facilitate easy alignment of the filter elements 7. However, this aligning function is not necessarily a prerequisite. Any arbitrary structure may be utilized so long as it may be closely held against the body 1 and the end plate 4 and can join two or more filter elements 7 by means of the head cover 11 and the end cover 12 which constitute the essential elements of the connecting means of the invention.

In this embodiment, there are further provided two filter elements 7 serially connected with each other and inserted between the body 1 and an end plate 4. In order to adapt the assembly to enable changes in the capacity of the volume of air flow to be processed, the number of filter elements may be varied and the entire filter area may be adjusted. As seen in FIG. 3, the filter unit is mounted within the housing 17 by a bolt 5 which extends in connecting engagement between the end plate 4 and the body 1. In the event that the flow capacity of a particular filter assembly must be varied, it becomes necessary to change the bolt 5 and the housing 17 as the need arises.

As previously mentioned, it is possible to utilize the filter elements of the present invention either singly or by connecting together a plurality of such elements and by inserting the elements as a filter unit in the assembly between the body 1 and the end plate 4. If a proper number of plural filter elements are connected serially together in correspondence with the volume of air to be processed, then the filtration area may be adapted to handle the volume of air involved. Thus it is therefore necessary to provide only one standardized filter element in order to provide filter units having different volume capacities and the number of the types of filter elements which are required is thereby increased to an absolute minimum and the cost of manufacture, storage and control may be radically curtailed.

In filtration assemblies constructed in accordance with the prior art it is necessary to exchange an entire filter unit even if only a single part thereof becomes clogged or if the desired filtering capacity is to be changed or maintained. However, when the filter unit is formed from a plural number of filter elements connected serially together and utilized to obtain a desired capacity of the filter unit as in the present invention, the filter element whose filtering capacity has deteriorated may be individually exchanged or replaced thereby enabling recovery of the function of the overall filter unit as a whole. Thus, it does not become necessary to exchange the entire filter unit when one part becomes clogged or when volume capacity is to be adjusted. Accordingly, by utilization of the present invention, filtration assemblies may be manufactured in the most economical manner.

While a specific embodiment of the invention has been shown and described in detail to illustrate the application of the inventive principles, it will be understood that the invention may be embodied otherwise without departing from such principles.

What is claimed is:

1. A filtration assembly for filtering fluid media, particularly compressed air, comprising: housing means defining a fluid inlet and a fluid outlet; a filter unit arranged within said housing means to have fluid media flowing between said inlet and said outlet pass therethrough; said filter unit comprising a plurality of generally cylindrical filter elements each having an upper end and a lower end, said filter elements being joined together with the upper end and lower end of each adjacent filter element juxtaposed to form said filter unit as a generally hollow cylindrical body; seal means mounting said filter unit within said housing so that substantially all fluid media flowing between said fluid inlet and said fluid outlet passes through said filter unit; connecting means located at said juxtaposed upper and lower ends of said filter elements operatively mounting said filter elements together; said connecting means including a head cover having a central aperture mounted at the upper end of each filter element and a bottom cover having a central aperture mounted at the lower end of each filter element, with said head covers and bottom covers being positioned between adjacent filter elements to join said filter elements together; said connecting means including a closure for the lower bottom cover and groove passage means formed in each of said head covers and bottom covers, said groove passage means defining a flow path for liquid impurities to drain from said filter elements and to pass between adjacent filter elements.

2. An assembly according to claim 1 wherein said connecting means comprise at least one head cover mounted at one end of a filter element and at least one bottom cover mounted at a juxtaposed end of an adjacent filter element mounting said ends together in fluid tight relationship.

3. An assembly according to claim 1 comprising a head cover of said connecting means mounted at one end of said filter unit and a bottom cover of said connecting means mounted at an opposite end of said filter unit to effect fluid tight connections, said groove means including a groove formed in said bottom cover at said opposite end of said filter unit through which liquid impurities may drain from said filter unit.

4. An assembly according to claim 3 wherein each of said filter elements forming said filter unit is dimensionally standardized and operationally interchangeable.

5. An assembly according to claim 3 wherein said head cover comprises a generally annular member having an annular recess defined therein, wherein said bottom cover comprises a generally annular cylindrical body located to extend into sealed engagement with said annular recess and wherein said seal means comprise a sealing ring arranged within said recess in sealed engagement between said head cover and said bottom cover.

6. An assembly according to claim 1 wherein said housing means comprise a body member having said inlet and said outlet defined therein, said connecting means further including an end plate attached at one end of said cylindrical body of said filter unit and an elongated bolt extending through said filter unit in mounting engagement between said end plate and said body member.

7. An assembly according to claim 1 wherein each of said filter elements comprise a plurality of filter layers.

* * * * *